UNITED STATES PATENT OFFICE.

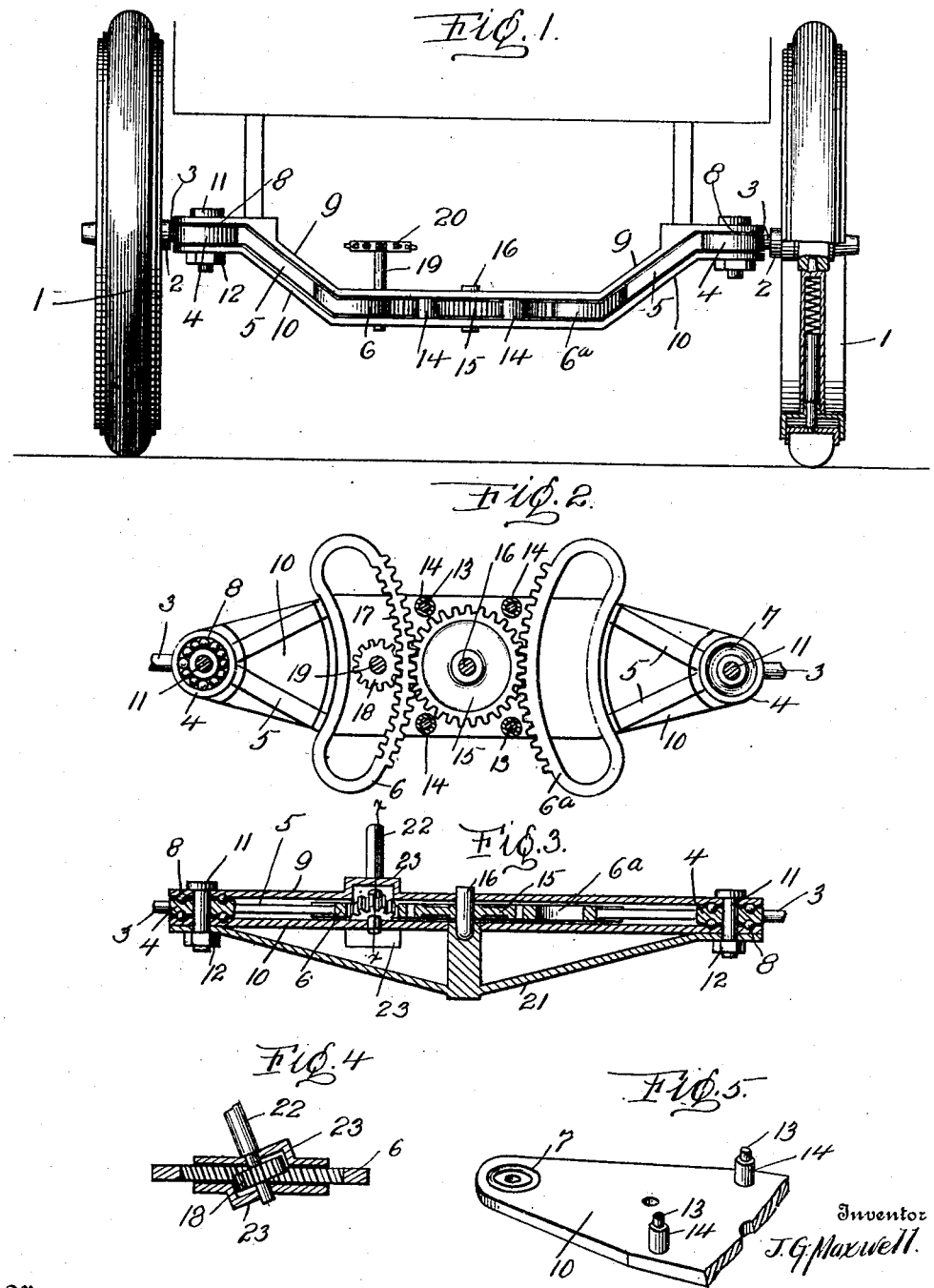

JAMES G. MAXWELL, OF WASHINGTON, PENNSYLVANIA.

STEERING MECHANISM.

No. 898,249.  Specification of Letters Patent.  Patented Sept. 8, 1908.

Application filed December 17, 1907. Serial No. 406,848.

*To all whom it may concern:*

Be it known that I, JAMES G. MAXWELL, a citizen of the United States of America, residing at Washington, in the county of Washington and State of Pennsylvania, have invented certain new and useful Improvements in Steering Mechanism, of which the following is a specification, reference being had therein to the accompanying drawing.

This invention relates to a steering mechanism for automobiles and similar vehicles, and the primary object of the invention is, to provide positive and reliable means for guiding the wheels of an automobile.

Another object of this invention is to provide a steering mechanism that will insure a safe lateral movement of vehicle wheels while said wheels are revolving.

My invention aims to provide a novel axle for a vehicle, wherein the steering mechanism is located and protected. In this connection, my invention aims to dispense with the present type of swivel wheels, and to provide wheels having axles terminating intermediate said wheels and approximately at the longitudinal axis of the vehicle. To this end, I construct an axle in two parts and pivotally mount these axles between two plates suitably connected together. The inner or confronting ends of the axles are provided with segment-shaped racks adapted to mesh with a pinion, which through the medium of gear wheels is rotated to swing the axles and move the wheels carried thereby in unison.

The detail construction entering into my invention will be presently described, and then specifically pointed out in the appended claims.

In the drawings: Figure 1 is an elevation of the steering mechanism, Fig. 2 is a plan of a portion of the steering mechanism, Fig. 3 is a longitudinal sectional view of a modified form of construction, Fig. 4 is a cross sectional view of the same, taken on the line x—x of Fig. 3, and Fig. 5 is a perspective view of a portion of one of the axle holding plates.

In the accompanying drawings, I have illustrated wheels 1 having hubs 2 prolonged or provided with axles 3, each axle comprising a bearing 4, arms 5, and slotted segment shaped racks 6 and 6ª. The bearings 4 are provided with ball races 7 for bearing balls 8, which are arranged between the bearings 4 and plates 9 and 10. The plates 9 and 10 are connected together by bolts 11 and nuts 12, said bolts serving as pivot pins for the axles 3. Besides these bolts for connecting the plates 9 and 10 together, I use rivets or pins 13 surrounded by sleeves 14 for properly spacing the plates 9 and 10.

Interposed between the segment shaped racks 6 and 6ª is a pinion 15 meshing with said racks. This pinion is mounted upon a vertical shaft 16, journaled in the plates 9 and 10. The rack 6 is provided with an extra set of teeth 17 for meshing with a pinion 18 mounted upon a shaft 19, this shaft being journaled in the plates 9 and 10 and provided with a sprocket wheel 20. Through the medium of the sprocket wheel 20 and a suitable steering rod, sprocket wheel and chain (not shown), the rack 6 and 6ª can be moved to swing the wheels 1 in the desired direction.

I have illustrated plates 9 and 10 as having their central portions depressed or out of alinement with the axles 3 of the wheels 1. The arms 5 are formed to fit between the plates 9 and 10, and serve functionally the same as if the plates and arms were parallel, as illustrated in Fig. 3 of the drawings. In this figure the construction is similar to that shown in Fig. 1, with the exception that a truss 21 is secured to the plate 10 through the medium of the bolts 11 and nuts 12. Instead of using the sprocket wheels 20, I use a steering rod 22, this rod being journaled in suitable bearings 23 carried by the plates 9 and 10. When a steering rod is used directly for moving the rack 6 I incline the teeth 17 of said rack and position the steering rod and pinion 18 at an angle, all corresponding to the present type of steering rod used in connection with automobiles.

From the foregoing description taken in connection with the drawings, it will be apparent that the axles 3, bearings 4, arms 5 and the plates 9 and 10, above and below, will provide practically a rigid axle.

The axle bearings having free and easy movement, between the supporting plates 9 and 10, insures easy guidance of the vehicle wheels, without impairing the safety of the axle as a supporting medium for a vehicle body.

My invention can be used in connection with vehicles of various types, and for this reason, I do not care to confine myself to the size, proportion or minor details of construction as fall within the scope of the appended claims.

Having now described my invention what I claim as new, is:—

1. A steering mechanism comprising the combination with the hubs of a pair of wheels, of a pair of supporting plates, an axle mounted in each of the hubs and provided with an inward extension terminating in a bearing and positioned between the plates at one end, means extending through the plates and bearings for pivotally connecting the bearings, a pair of confronting segment shaped racks interposed between said plates and of a length greater than the width of the plates, a pinion arranged between and meshing with the racks, a vertical bearing for the pinion, a pair of connecting members one being between each rack and its adjacent bearing, said members positioned between said plates, an actuating pinion arranged within and engaging with one of the racks and adapted when operated to shift the first mentioned pinion and the racks whereby the bearings are revolved upon their connecting means, and means for operating the actuating pinion.

2. A steering mechanism comprising the combination with the hubs of a pair of wheels, of a pair of supporting plates, an axle mounted in each of the hubs and provided with an inward extension terminating in a bearing and positioned between the plates at one end, means extending through the plates and bearings for pivotally connecting the bearings, a pair of confronting segment shaped racks interposed between said plates and of a length greater than the width of the plates, a pinion arranged between and meshing with the racks, a vertical bearing for the pinion, a pair of connecting members one being between each rack and its adjacent bearing, said members positioned between said plates, an actuating pinion arranged within and engaging with one of the racks and adapted when operated to shift the first mentioned pinion and the racks whereby the bearings are revolved upon their connecting means, means for operating the actuating pinion, each of said bearings having a grooved upper and lower face and each of said plates provided with grooves opposing the grooves in the bearings, said grooves constituting ball races, and bearing balls mounted in said ball races.

In testimony whereof I affix my signature in the presence of two witnesses.

JAMES G. MAXWELL.

Witnesses:
C. A. ELY,
W. D. McCARRELL.